United States Patent Office 3,475,094
Patented Oct. 28, 1969

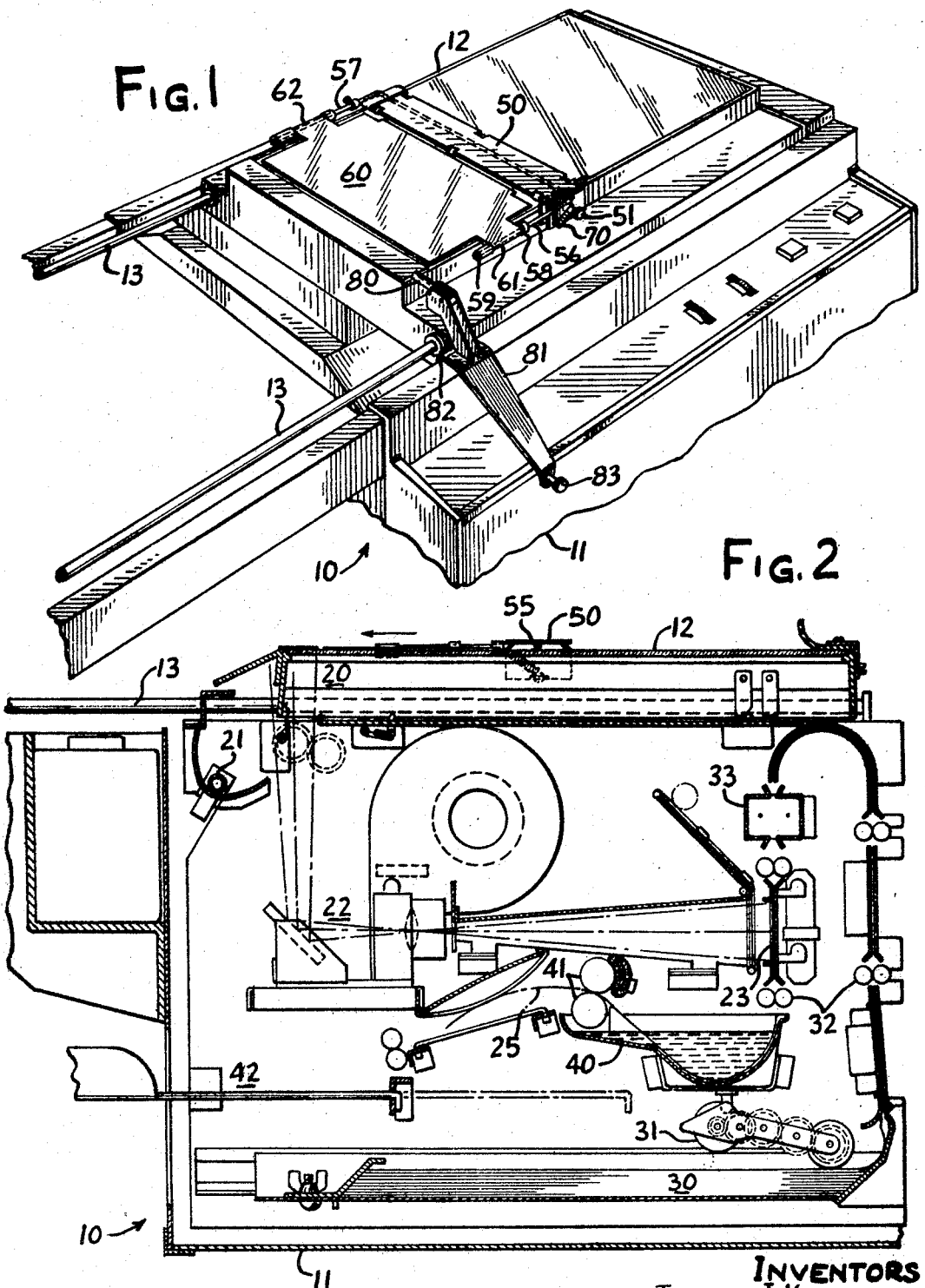

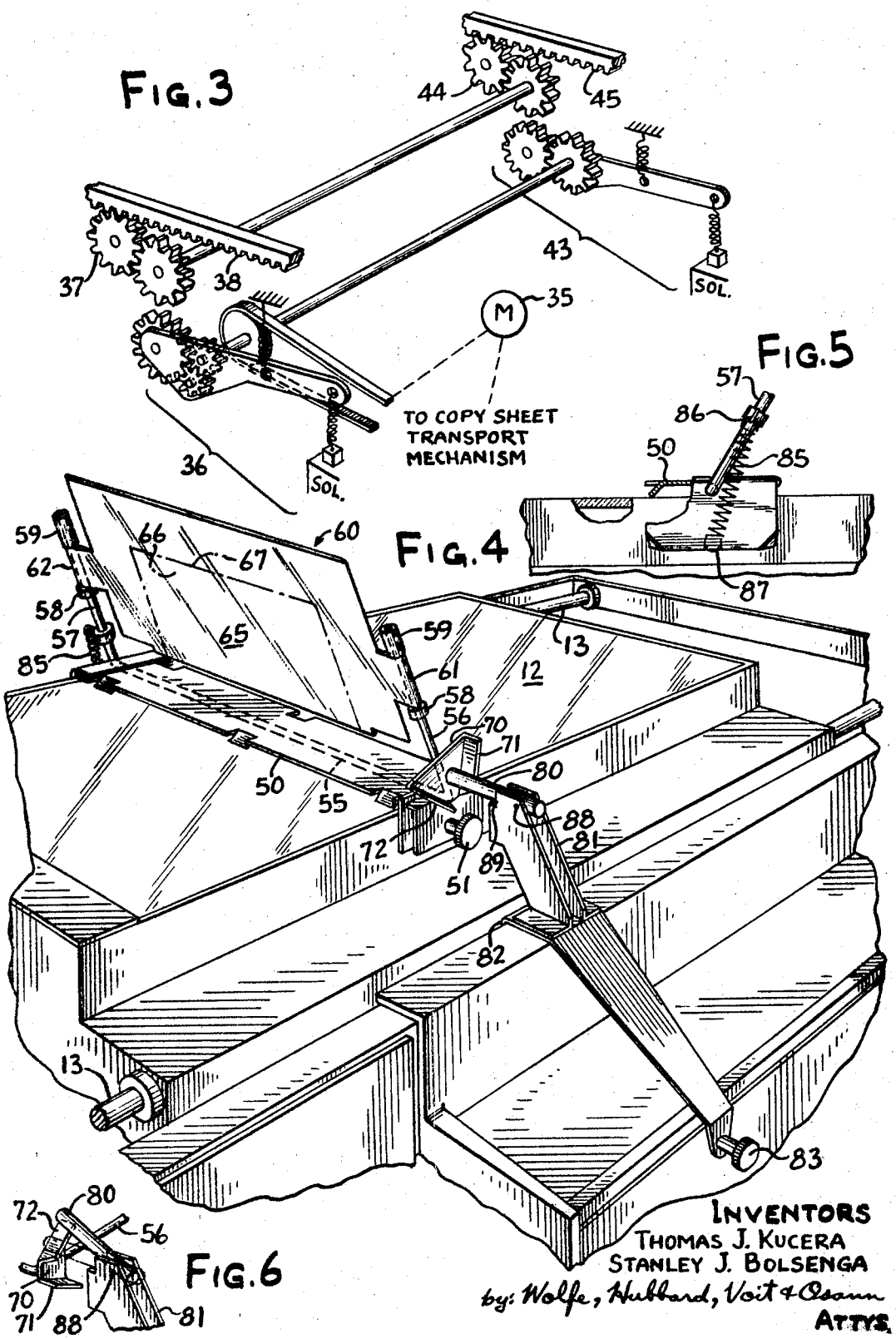

3,475,094
MACHINE FOR COPYING OPPOSITE FACES OF SMALL DOCUMENT
Thomas J. Kucera and Stanley J. Bolsenga, Evanston, Ill., assignors to American Photocopy Equipment Co., Evanston, Ill., a corporation of Illinois
Filed Feb. 6, 1967, Ser. No. 614,089
Int. Cl. G03b 27/32
U.S. Cl. 355—23      5 Claims

ABSTRACT OF THE DISCLOSURE

A photocopy machine of the type in which the field of the original document is optically scanned from one end to the other and in which a flipping device is provided for holding a small document first in one half of the scanned area and then in the other half for making a copy of the opposite faces of the document on the same copy sheet.

---

It is an object of the present invention to provide a document flipping arrangement for a photocopy machine which secures a copy of both faces of a small document, such as an IBM card, or other record card, on the same copy sheet. It is a related object to provide a document flipping device which can be used in any photocopying machine having a relatively flat scanned field for the original and which is easily installed and used, requiring little or no modification of existing structure and enabling attachment by the machine operator without any special skill or instructions wherever double-face copying of small documents is desired.

It is another object to provide a flipping arrangement which is powered by movement of the carrier, which is inherently fast in operation and in which "idle" space in the scanned field of the original document is reduced to a minimum. It is another object to provide a flipping device which is capable of double-face copying of all small documents regardless of size and shape and which may be quickly loaded and unloaded. In this connection it is an object to provide a flipping device which is automatically restored to its initial loading position.

Other objects and advantages of the invention will be apparent from the attached detailed description and from the drawings, in which:

FIGURE 1 is a perspective view, with portions broken away, of a photocopy machine employing the present invention;

FIG. 2 is a vertical section, taken lengthwise, of the photocpy machine shown in FIG. 1;

FIG. 3 is a simplified perspective view showing the carrier driving elements;

FIG. 4 is a perspective view similar to FIG. 1 showing the document support undergoing flipping motion;

FIG. 5 is an opposite end view of the mount showing the overcenter spring; and

FIG. 6 shows the actuating member undergoing idle movement.

While the invention has been described herein in connection with a preferred embodiment, it will be understood that we do not intend to be limited to the particular embodiment but intend, on the contrary, to cover the various alternative and equivalent constructions included within the spirit and scope of the appended claims.

Turning now to the drawings there is shown at 10 a photocopy machine of a type well known in the art having a frame 11 topped by a flat, reciprocating carrier 12, riding on rails 13. The carrier is of rectangular shape and is transparent to accommodate original documents which are faced downwardly. A flexible cover (not shown) may ordinarily be used to hold the originals in place.

For the details of the structure and operation of the machine used in its normal mode, reference is made to copending Sacre application Ser. No. 487,496, filed Sept. 15, 1965. It will suffice to say that the machine includes an illuminating station 20 having lamps 21. The "field" of the original document, i.e., the area available for copying purposes, is scanned as it moves progressively past the illuminating station. The image of the original passes through a lens and mirror combination 22 to an exposing station 23 which holds in position a photocopy sheet 25. While the nature of the sheet is not important to the present invention, the machine shown employs the well-kown "Electro-fax" process using paper coated with finely divided zinc oxide in a dielectric binder.

The copy sheets are stored in a reservoir 30 from which each sheet 25 is fed by an intermittent feed motor 31 to a copy sheet transport mechanism 32. As the sheet is transported it is subjected to an electrostatic charge by a high voltage charging unit 33, preparatory to exposure. The transport mechanism is powered by a drive motor 35 which, through a forward drive clutch 36, pinion 37 and rack 38 serves to advance the carrier 12. Thus the moving image from the original is cast upon the synchronously moving copy sheet as it passes through the exposing station.

The pattern of light from the original document selectively discharges the copy sheet to produce a corresponding latent image in the surface of the copy sheet. The sheet is then passed through a developing unit 40 which houses a body of dielectric liquid having toner powder in colloidal suspension. The toner powder is attracted to the charged areas, thereby recreating the original pattern, following which the sheet is passed through "squeegee" rollers 41 and discharged through the exit 42. Upon completion of the forward stroke, a control circuit (not shown) deenergizes the forward drive clutch and energizes a reverse drive clutch 43 so that a pinion 44, via rack 45, drives the carrier, at a high "return" speed, in the reverse direction to complete the cycle.

In accordance with the present invention a document flipping device is provided for holding one face of a small original document in the first half of the field and for swinging the document bodily so that its other face is presented at the second half of the field timed with the relative approach of the scanning means to the middle of the field. More specifically, a rockable shaft is provided extending transversely at the middle of the field having means for supporting the document in the field on one side as the side is scanned followed by rapid swinging of the document into the field on the other side when the carrier approaches the mid-position of its movement. Turning to the drawings, and particularly to FIGS. 1 and 4 a mount 50 is provided at the middle of the carrier in the form of a strip of metal bent down at its ends to embrace the sides of the carrier and held in place by a clamp 51 at one end. Extending through alined openings provided in the mount is a transverse shaft 55 having arms 56, 57. Secured to the arms, and bridging the space between them is a document support 60 in the form of a transparent envelope formed of suitable transparent material such as Mylar film having loops 61, 62 receiving the arms 56, 57 of the shaft. The loops are positioned by shoulders 58 and end caps 59. The envelope being open at the top, it is a simple matter to slip an original document, such as the card 65 into place for copying of its faces 66, 67.

For the purpose of swinging the envelope 60 from one side to the other, there is provided an actuating arm at one end of the shaft in the form of a sector plate 70 having side flanges 71, 72 secured to the end 56 of the shaft. Arranged in the path of movement of the surfaces on the actuating arm is a relatively stationary actuating member 80 in the form of a horizontally extending pin mounted on the frame of the machine. In the present instance the pin is mounted on a bracket 81 which has a hook 82 at one end and a clamping screw 83 at the other end. The bracket 81 is clamped at approximately the mid-position of carrier movement. Thus upon approach of the carrier, after scanning of the first side, the pin 80 engages the surface 71, rocking the shaft 55 so that the envelope 60 swings upwardly from the first copying position as shown in FIG. 4.

In order to impart snap action and for holding the envelope snugly against the carrier in both of its alternate positions, an over-center spring 85 is provided connected to the arm 57 at end 86 and to a fixed anchoring point 87, centered below the transverse shaft. Thus as the envelope traverses the vertical position it is snapped downwardly presenting the second face to the second half of the field safely before scanning of the second face begins. The opposite face is thus scanned so that the latent images of both faces, in the form of charge patterns, appear side by side on the moving copy sheet. From the exposing station the sheet moves into the developing unit where toner powder is deposited, in accordance with the charge pattern, to develop the image. The excess liquid is squeezed out by the "squeegee" rollers 41 and the almost-dry copy is discharged through the exit 42. When the carrier reaches the end of its stroke the forward drive clutch 36 is deenergized and the reverse drive clutch 43 is energized to initiate the return movement. During the course of such movement of the actuating member 80 engages the side flange 72 on the actuating arm causing the envelope 60 to flip back to its original position. The cycle may be repeated as often as desired. Where cards are to be copied in sequence, it is a simple matter to withdraw one and substitute another in the transparent envelope.

In the event that the machine is operated with the actuating arm 70 out of phase with the direction of movement of the table so that the actuating member 80 engages the backside of one of the flanges 71, 72, the actuating member is mounted for idle camming upwardly to an out of the way position. This is brought about by securing the member 80 to the bracket 81 by a horizontal pivot pin 88, the upwardly cammed position being indicated in the drawing (FIG. 6). The normal, or horizontal, position of the member 80 is defined by a stop surface 89. After being cammed the actuating pin is free to drop back to its normal working position so that during the return stroke of the carriage the document holder will be in position to begin the copying cycle.

When it is desired to make conventional copies it is a simple matter to release the clamp 51 so that the mount 50 may be removed from the carrier. Alternatively, the mount 50 may simply be slid to the "far" end of the carrier where it is out of the way and does not affect the making of ordinary, letter size photocopies. The bracket 81, which holds the actuating member 80, may be simply left in place and does not affect the making of copies in the regular way.

We claim as our invention:

1. In a photocopy machine for producing a copy of both faces of a small original document upon a single copy sheet, the combination comprising a frame, an illuminating station having a source of light, a movable carrier on the frame including a rectangular glass supporting panel having a first half and a second half and having driving means for reciprocating the carrier past the illuminating station for illuminating the halves of the panel in succession, an exposing station, means for supporting a photosensitive copy sheet in the exposing station, means for optically coupling the illuminating station to the exposing station including drive means coupled to the carrier so that the scanned image of the original is cast progressively upon the copy sheet, a document flipping device on the reciprocated carrier including a transversely extending mount secured to the center portion thereof, a transversely extending shaft rockable in said mount, document engaging means on said shaft for holding the document in a first position with one face presented to the first half of the glass panel and for holding the document in a second position with its other face presented to the second half of the glass panel as the shaft is rocked between alternate positions, an actuating arm at one end of the shaft, means including a relatively stationary actuator on the frame for engaging the arm for swinging of the document from its first position to its second position as the carrier approaches the mid-position of its movement, and means actuated by movement of the carrier in the opposite direction for restoring the document to its first position in readiness for insertion of a new original.

2. The combination as claimed in claim 1 in which an over-center spring is connected to the shaft for causing the shaft to snap to its alternate position when the arm is engaged by the actuator.

3. The combination as claimed in claim 1 in which the actuating arm has a first surface for engagement by the actuator during movement of the carrier in one direction and a second surface for engagement of the actuator during return movement of the carrier so that the original document is restored to its original position.

4. The combination as claimed in claim 3 in which the actuator is in blocking position upon phased engagement of the engaging surfaces on the actuating arm but includes provision for cammed movement to an out of the way position upon engagement in the out of phase condition.

5. For use with a photocopy machine of the type having a frame and an original document carrier having a rectangular glass panel reciprocated in the frame, a document flipping device for flipping a small document on the carrier comprising a mount having means for clamping the same at the middle of the panel in transversely-extending position, a transversely extending shaft rockable in said mount between alternate positions, means on the shaft for holding the document with its opposite faces pressed flatly against the panel on the opposite sides of the mount with the shaft in its respective alternate positions, an actuating arm on the shaft, an actuator arranged for mounting on the frame of the machine in the path of movement of the actuating arm so that the arm is actuated to rock the shaft as the carrier approaches the mid-position of its range of movement, and means for imparting snap action to the shaft to minimize transit time between the alternate positions of the shaft, the actuator being in the form of a projecting horizontal pin and the actuating arm being in the form of a sector plate having side flanges for engaging the pin incident to movement of the carrier in its respective opposite directions.

References Cited
UNITED STATES PATENTS

| | | | |
|---|---|---|---|
| 1,696,381 | 11/1928 | Caps | 88—24 |
| 1,728,102 | 9/1929 | Caps | 88—24 |
| 3,380,570 | 4/1968 | Jordan | 198—33 |
| 3,381,573 | 5/1968 | Caldwell | 88—24 |

NORTON ANSHER, Primary Examiner

W. A. SIVERTSON, Assistant Examiner

U.S. Cl. X.R.
95—12; 355—75